US008525829B2

(12) United States Patent
Smithwick et al.

(10) Patent No.: US 8,525,829 B2
(45) Date of Patent: Sep. 3, 2013

(54) TRANSPARENT MULTI-VIEW MASK FOR 3D DISPLAY SYSTEMS

(75) Inventors: Quinn Smithwick, Pasadena, CA (US); Lanny S. Smoot, Thousand Oaks, CA (US); Daniel Reetz, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 213 days.

(21) Appl. No.: 13/236,060

(22) Filed: Sep. 19, 2011

(65) Prior Publication Data
US 2013/0069933 A1    Mar. 21, 2013

(51) Int. Cl.
*G06T 15/00* (2011.01)
(52) U.S. Cl.
USPC ........................................... 345/419
(58) Field of Classification Search
USPC ........................................... 345/419
See application file for complete search history.

(56) References Cited

U.S. PATENT DOCUMENTS

2012/0056896 A1* 3/2012 Border ........................ 345/592
2012/0099194 A1* 4/2012 Verschuren ................. 359/463

OTHER PUBLICATIONS

Olwal, Alex, et al. "ASTOR: An autostereoscopic optical see-through augmented reality system." Mixed and Augmented Reality, 2005. Proceedings. Fourth IEEE and ACM International Symposium on. IEEE, 2005.*

* cited by examiner

*Primary Examiner* — Kee M Tung
*Assistant Examiner* — Richard M Russell
(74) *Attorney, Agent, or Firm* — Marsh Fischmann & Breyfogle, LLP; Kent A. Lembke

(57) ABSTRACT

A multi-view mask apparatus for creating a three-dimensional (3D) display. The apparatus includes a relay lens assembly that is non-inverting of images passed through the relay lens assembly including images of background objects. The apparatus includes a mask display device concurrently displaying first and second mask content via the relay lens assembly. The first mask content is viewable from a first point of view (POV) and the second mask content is viewable from a second POV or the first mask content is apparent from a first light source direction and the second mask content is apparent from a second light source direction. The relay lens assembly includes four lenticular sheets arranged into first and second pairs with adjacent back sides. The mask display device is disposed in one pair between two lenticular sheets and operated to display the first and second mask content as interlaced images under the lenticules.

20 Claims, 6 Drawing Sheets

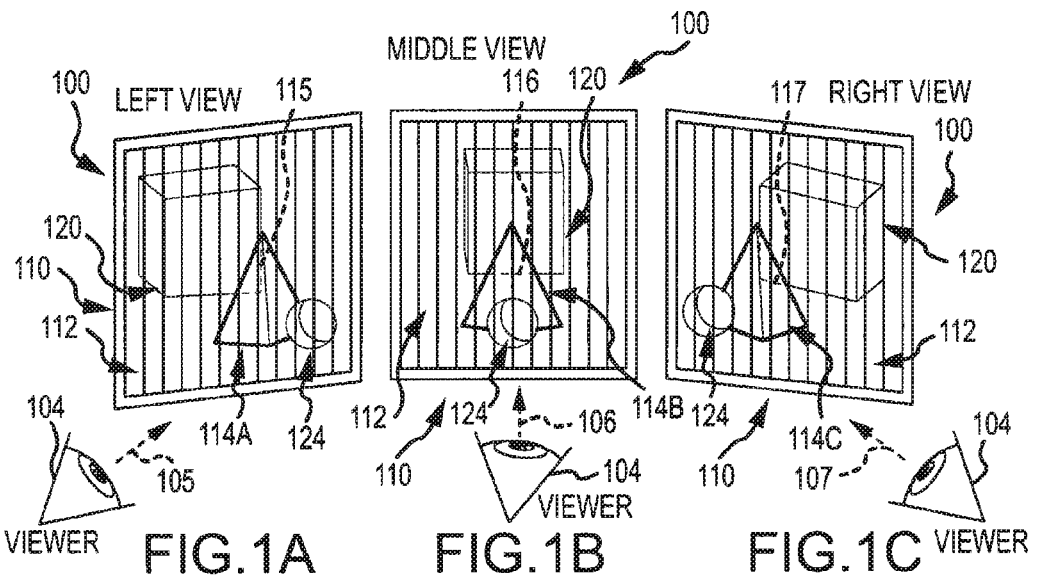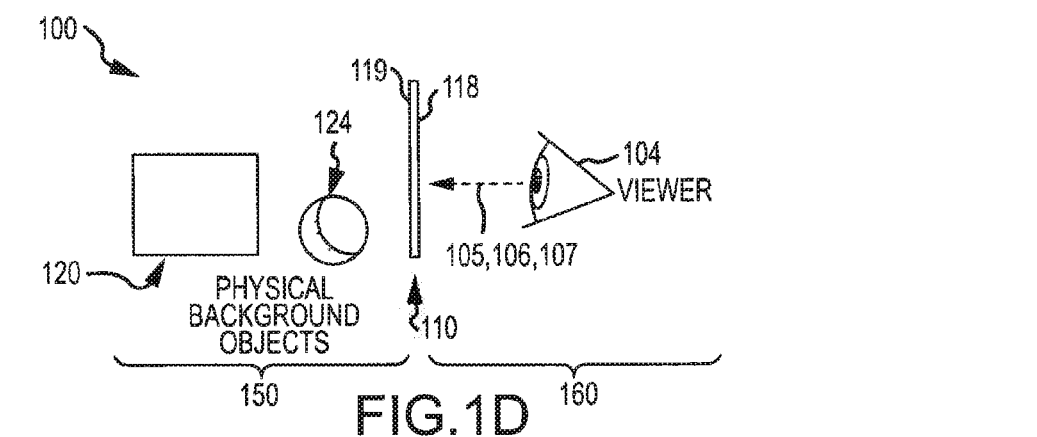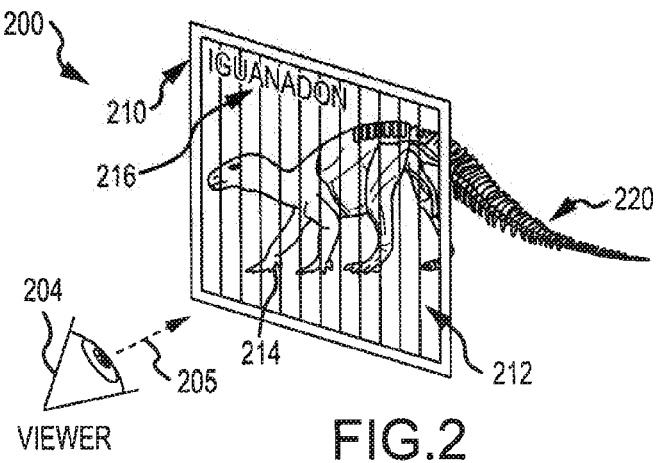

TRANSPARENT MULTI-VIEW MASK FOR 3D DISPLAY SYSTEMS

BACKGROUND

1. Field of the Description

The present invention relates, in general, to projecting or displaying video/animated or still three dimensional (3D) images, and, more particularly, to autostereoscopy methods and systems for providing glasses-free 3D using a transparent multi-view mask or "magic window" capable of selectively blocking, filtering, passing, or even adding light to objects viewed through the multi-view mask or magic window.

2. Relevant Background

There are numerous entertainment and other settings where it is desirable to create unique visual displays to entertain and excite viewers. For example, theme or amusement parks may include rides or walk-through attractions where guests (or "viewers") are entertained by a unique visual effect or illusion. Often, it is desirable to create a display with three dimensional (3D) images, and, even more desirable for many entertainment facility operators is to provide the 3D display without requiring the viewer to wear special headgear or glasses, e.g., using autostereoscopy or similar techniques.

With this in mind, Pepper's ghost is an illusionary technique used by magicians, by ride or attraction designers, and others to produce a 3D illusion of a latent or ghost-like image. Using a simple piece of plate glass and special lighting techniques, Pepper's ghost systems can make objects appear and disappear within a scene or room. Generally, these systems include a main room or scene that is readily viewed by a guest or viewer and a hidden room that is not visible to the viewer, and both rooms may be identical in their physical structure including furniture and other objects except the hidden room may include additional objects or characters such as a ghost. A large piece of glass or a half-silvered mirror is situated between the viewer and the scene at an angle, such as at about 45 degrees. When the main, room is lit and the hidden room is darkened, the viewer only sees the main room as the hidden room does not reflect from the glass and the sheet of glass is itself hard to see as it typically extends across the entire view of the main room.

Pepper's ghost then becomes very visible to the viewer when the entire hidden room or portions such as the ghost or other character are brightly lit. Since only a portion of the light cast upon the ghost or other objects in the hidden room is reflected from the glass, the reflected images appear as latent or ghostly images relative to the objects in the main room (e.g., the reflected images or images superimposed in the visible room may appear to float). The Pepper's ghost image is a 3D image that may be a still image or animation may be provided such as with animatronics providing the "ghost" or by placing a live actor in the hidden room. In many current systems, a 2D display is used as it is more dynamic and controllable and does not require a live actor or expensive animatronics. In a broad sense, then, the Pepper's ghost systems may be thought of as implementing autostereoscopy, which is generally a method of displaying 3D images that can be viewed without the use of headgear or glasses on the part of the user.

From the above discussion, it can be understood that a traditional Pepper's Ghost illusion uses a partially reflecting pane of glass or beam splitter to overlay a physical object's reflection onto a real world scene. The reflected physical object appears three dimensional and appears to occupy space in the real world scene. Unfortunately, the reflected physical object also appears translucent and ghostly and does not cast a shadow. Efforts have been made to provide dynamic masks within the real world scene to block the background and make the reflected object appear opaque and to cast a true shadow.

However, for both a physical object and a dimensional display, the silhouette changes according to a viewer's view point. Similarly, a cast shadow changes according to light source direction. In one application, a dynamic mask produced from a 2D display is used to create a 3D display but the 2D display can only produce a correct silhouette mask for one view point. For example, the 3D display may be improved with a proper silhouette and opacity of displayed 3D objects, but it may only appear correct or be effective when viewed from one positioned (e.g., a viewer with an orthogonal or direct-on view point) and the 3D display loses its correctness when the viewer moves to the left or right and changes their point of view. Similarly, the cast shadow would be that of a flat 2D silhouette, and the shadow would lose its correctness if the light source direction changed.

Hence, there remains a need for improved visual display techniques and systems for creating or projecting 3D images. Preferably, such an advanced 3D display system would provide a higher contrast, solid or opaque-appearing, and 3D dimensional image without requiring a viewer to wear special head gear or glasses. Further, it is preferred that the display system produces a 3D image that may be viewed from multiple points of view, e.g., the system may be considered a "multi-view" 3D display system.

SUMMARY

The present invention addresses the above problems by providing a 3D display system that includes a transparent multi-view mask assembly that is operable to provide a set of two, three, or more masks that are each viewable from a different point of view (POV) or viewing angle. For example, the mask assembly may provide content such as a virtual object that can be viewed concurrently with background or set objects to provide a 3D display, and the virtual object and silhouettes/shading will be proper at two, three, or more POV (e.g., at an orthogonal or direct-on viewing position, at a left viewing position at 10 to 45 degrees clockwise from the vertical orthogonal plane, and at a right viewing position at 10 to 45 degrees counterclockwise from the vertical orthogonal plane). Further, the cast shadows would be correct or desirable for two, three, or more lighting directions (e.g., at an orthogonal lighting direction, a left lighting direction, and a right lighting direction). In other embodiments, a 3D physical object viewed through the mask assembly is dynamically augmented with images and/or labels/textual/graphical information such as by operating the mask assembly to provide a 3D computer graphic overlay with portions viewable from differing POV. For example, 3D computer graphic overlays may be superimposed over physical or even virtual objects (or holograms) with correct occlusion.

Briefly, the multi-view mask assembly may include a mask display device such as a transparent liquid crystal display (LCD) panel that is operated to concurrently display a number of masks (which may include overlay or augmentation content). Each mask or set of display content is generally only viewable from a single POV out of two, three, or more POV or viewing angles by a viewer. The mask assembly also includes a non-inverting relay lens assembly that functions to be transparent to a background space or physical set with 3D objects and to allow viewing of these images with proper orientation (e.g., not flipped or inverted and not significantly distorted or blurred). In one exemplary embodiment, the non-inverting relay lens assembly includes a stack of four lenticular sheets with aligned groups of four lenticules with the sheets arranged in two pairs (or two relay lenses) with back or planar sides of each paired lenticular sheet in contact or mated together. The mask display device (e.g., an LCD) is sandwiched between one of these two pairs of lenticular sheets with a number of columns of pixels (or number of sets of pixels) provided under each elongated lens or lenticule. By selectively programming the pixel columns of the display device, light from the background and light source directions can be selectively blocked, filtered/modulated, and passed. Additionally, the display element may act as a transmissive display element and add light to the display viewable via the multi-view mask assembly.

More particularly, a multi-view mask apparatus is provided for creating a three-dimensional (3D) display. The apparatus includes a relay lens assembly that is transparent and is non-inverting of images passed through the relay lens assembly. The apparatus further includes a mask display device operable to concurrently display a first mask content and a second mask content via the relay lens assembly. The first mask content is viewable from a first point of view (POV), and the second mask content is viewable from a second POV differing from the first POV.

In some embodiments, the relay lens assembly includes a stack of four lenticular sheets formed of a transparent material with lenticules of the lenticular sheets being aligned (e.g., four lenticules stacked upon each other). The lenticular sheets may be arranged into first and second pairs (e.g., first and second relay lenses) with back, planar sides arranged to be proximate and facing each other. The mask display device is typically disposed within one of the first and second pairs of the lenticular sheets between and in contact with the back, planar sides. The other one of the first and second pairs of the lenticular sheets is arranged with the back, planar sides in abutting contact. In such embodiments, a thickness of the first or second pair of the lenticular sheets including the mask display device equals a thickness of the first or second pair without the mask display device. Also, in many cases, the mask display device includes a transparent absorptive display, such as a liquid crystal device or an organic light-emitting diode panel with first and second sets of pixels associated with each of the lenticules and the first and second sets of pixels being operated or controlled to display the first and second mask content.

In some embodiments, the mask display device includes a plurality of programmable pixels selectively operable to provide the first and second mask content including a number of the pixels operating to block light and a number of the pixels passing light. Further, the programmable pixels may be operable with a number of the pixels modulating light and a number of the pixels adding light. In the apparatus, a background space may be provided that is viewable through the relay lens assembly and the mask display device, and, further, the apparatus may include a controller selectively inputting a display input to the mask display device including the first and second mask content. In such cases, the background space may include at least one physical 3D object and the display input includes interdigitized or interlaced masks with proper occlusion and/or silhouetting for the physical 3D object at the first POV and also at the second POV.

BRIEF DESCRIPTION OF THE DRAWINGS

FIGS. 1A-1D illustrate a 3D display system with a transparent multi-view mask of the present description showing use to provide a viewer a left view, a middle/orthogonal view, and a right view in FIGS. 1A-1C, respectively, and showing the display systems is a side view with FIG. 1D;

FIG. 2 illustrates a portion of a 3D display system operating to provide a 3D display that augments a real world object with 3D imagery;

DETAILED DESCRIPTION

Figure 3:
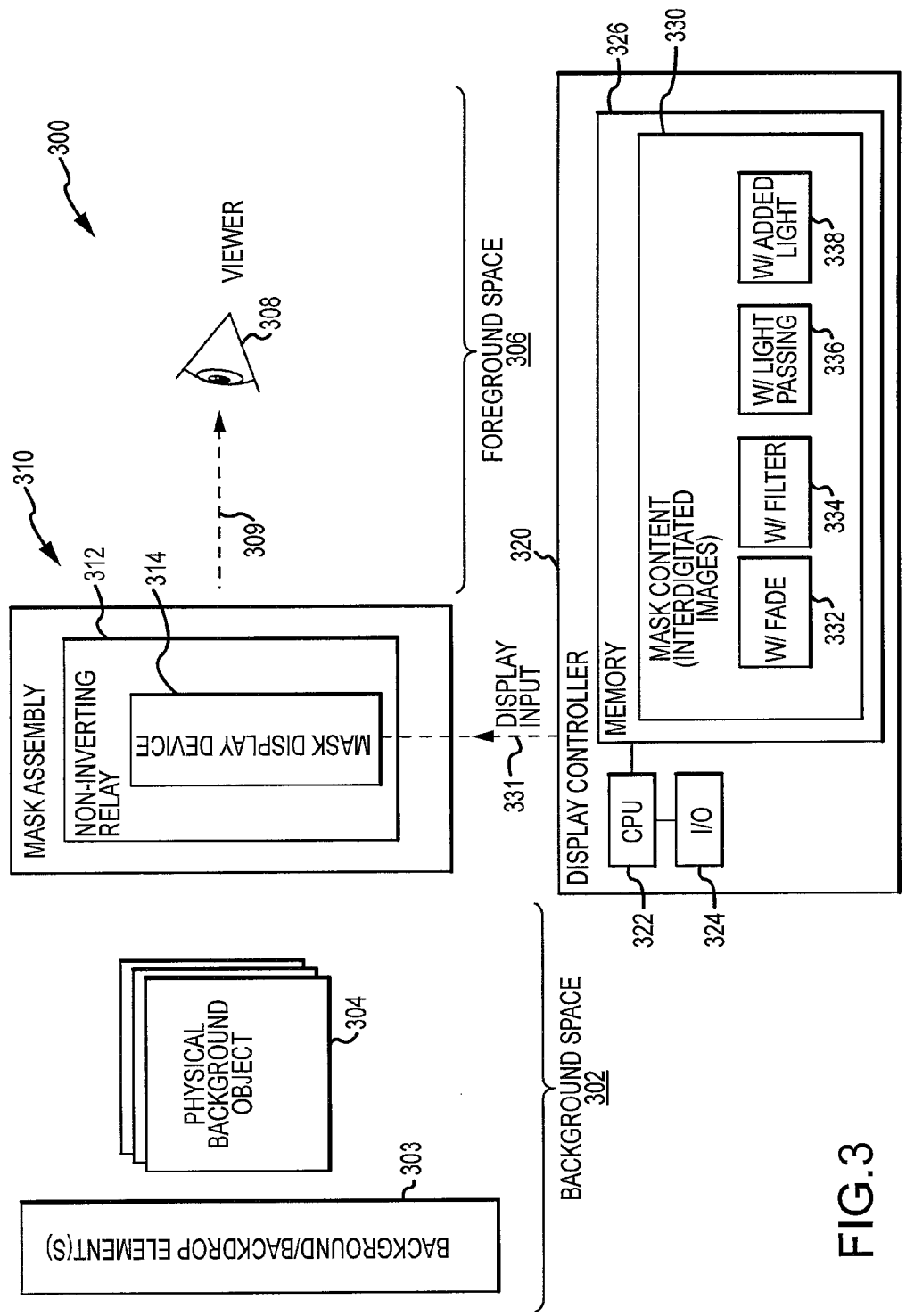
FIG. 3 illustrates in functional block form a 3D display system using a mask assembly described herein to provide a 3D display to a viewer without requiring the viewer to wear special headgear or glasses.

Briefly, embodiments described herein are directed toward a 3D display system that includes a multi-view mask that is adapted to display two, three, four, or more differing sets of content. These differing sets of content or images are concurrently displayed on the multi-view mask but at differing output angles associated with differing viewers' points of view (POV) or light source directions. The multi-view mask is adapted to be selectively transparent (or to pass light) such that it acts as a window to a physical set or background space, and, when a viewer views the multi-view mask from a foreground space, the multi-view mask can also selectively block, filter, or even add light as part of displaying the sets of images or display content. In operation, the mask acts like a magic window providing a differing view to a physical set or background space due to the concurrently displayed images or content in the mask that differ and are viewable at 2, 3, or more viewing angles or POV.

For example, the multi-view mask may be operated to provide a different silhouette mask depending on the viewpoint, while being transparent to the unmasked background. In other words, a first viewer with a generally orthogonal POV may see a first silhouette mask while a second viewer that is viewing the window to the right or left of the first viewer has a differing POV and views a second or third silhouette mask adapted, in some cases, to provide a correct or proper 3D view from that differing POV or viewing angle. This allows Pepper's Ghosts of physical objects (e.g., mannequins) or 3D virtual objects to appear to have high contrast and to be solid, to alternatively be translucent or ghostly, or in other cases to fade between these two presentations or appearances.

FIGS. 1A-1D illustrate a 3D display system 100 being used for a Pepper's Ghost-type application or display. FIG. 1A illustrates a viewer 104 viewing the display system 100 from a first POV or left view 105 (e.g., 10 to 30 degrees to the left of an orthogonal plane), FIG. 1B illustrates the viewer 104 viewing the display system 100 from a second POV or middle view 106 (e.g., with their head and eyes aligned substantially with an orthogonal plane or 10 to 15 degrees to the left or right in some cases), and FIG. 1C illustrates the viewer 104 viewing the display system 100 from a third POV or right view 107 (e.g., 10 to 30 degrees to the right of an orthogonal plane). FIG. 1D shows the display system 100 from the side showing that the viewer 104 is viewing the display system 100 from a foreground or forward space 160 in front of a multi-view mask 110 while a background space or physical set 150 is used to provide one or more physical background objects (e.g., 3D set pieces with a ball and box shown as examples only).

The background space 150 is shown to include a first object 120 (e.g., a 3D box or square block) and a second object 124 (a ball or sphere) placed in the foreground or upstage of the first object 120 relative to the multi-view mask 110 and viewer 104. Ambient or additional light from the background space 150 including light reflected from the objects 120, 124 strikes the back or inner side 119 of the multi-view mask 110. The multi-view mask 110 is operated or controlled to selectively pass the light striking the back or inner side 119 via its front or display side 118 where it can be viewed from POV 105, 106, or 107. In other words, the multi-view mask 110 may include areas or portions 112 that are transparent as shown in FIGS. 1A-1C that allow the background objects 120, 124 (and any other set pieces or light) to be viewed by the viewer 104 via POV 105, 106, 107. With differing POV 105, 106, and 107, the relative position of the foreground object 124 changes with respect to the background object 120 including the portions it block blocks from view and the shadowing viewed by viewer 104 as would be expected through a transparent window.

Concurrently, though, the multi-view mask 110 is operated to display a virtual object 114 (e.g., a 3D pyramid in this example) in the background space 150 with the objects 120, 124 (between in this example). The mask 110 operates or adjusts the three concurrently displayed sets of content to correctly display the virtual object 114 with regard to shadowing and also with regard to blocking by the objects 120, 124 for differing POVs 105, 106, 107. This is achieved although the virtual object 114 is being provided by the mask 110 via display surface or side 118, which is closer to the viewer 104 than the objects 120, 124. As shown in FIG. 1A, the virtual object 114A appears to the viewer 104 via left POV 105 to be in front and to the right of background object 120 while concurrently being behind and to the left of the foreground object 124. The set of left POV content displayed to the viewer 104 includes an opaque mask portion that provides the image of the virtual object 114A and blocks or occludes a portion 115 of background object 120 as would a physical object, and the content may also include a silhouette or shadow thrown by the virtual object 114A. The left POV content also includes an area associated with the virtual object 114A and foreground object 124 that would not be visible to the viewer 104 at left POV 105 because it is blocked by the object 124 (and this occluded and, therefore, not displayed portion avoids improper lighting of object 124).

As shown in FIG. 1B, the multi-view mask 110 is displaying to the viewer 104 along a middle POV 106 a set of middle POV content. This content again includes an opaque or blocking mask portion that displays or provides the image of the virtual object 114B reoriented to suit the middle POV 106 (e.g., to be more directly between the physical objects 120, 124 and directly behind object 124). Further, the transparent portion 112 includes a different transparent portion associated with the virtual object 114B that would be blocked by the foreground object 124 when the virtual object 114B is viewed from this middle POV 106, and a different occluded portion 116 of background object 120. Further, as shown in FIG. 1C, the multi-view mask 110 is displaying to the viewer along the right POV 107 a set of right POV content. This content includes an opaque or blocking mask portion that creates the image of the virtual object 114C in a position to the left of and in front of background object 124 to block or occlude a differing portion 117 of the object 124. The content also displays the image 114C in a position to the right of and behind the object 124 (i.e., a different portion of image 114C is not displayed because it is blocked by object 124); in other words, the transparent portion 112 of the right POV content includes a transparent portion associated with the virtual object 114C indicating that a differing portion of the virtual object 114C is "blocked" from view in the right POV 107 by the foreground object 124.

As can be seen from the simple display example of FIGS. 1A-1D, the multi-view mask 110 of the display system 100 is a view dependent mask. The mask 110 can be operated or controlled to block existing objects from all views or to provide a correct silhouette for a Pepper's Ghost of a real or physical 3D object or, as shown in the figures, of a virtual object for all view points. In addition to merely passing or blocking light selectively, light can be filtered as part of the view-dependent displays or content, and light can even be added in some cases by the multi-view mask 110. For example, the virtual object 114A-114C may be displayed by concurrently blocking, filtering, and adding light while also making portions transparent to pass light to allow foreground objects to block its view depending on view point.

As part of the development process, the inventors recognized that not only could the multi-view mask be used to selectively block or pass light from different positions and angles, the multi-view mask may also be used to introduce, remove, or modulate light selectively to produce 3D images or masks. In other words, 3D content can be added as standalone objects or as overlays of physical 3D objects in the background space. The 3D images or masks may also include areas that are selectively transparent to allow concurrent viewing of physical objects or set pieces in the background space with the displayed/generated 3D images. This may be useful, as an example, for providing a silhouette or shadow (not shown in the figures) on the front of the virtual object 114A-114C created by forward object 124 that varies with POV 105, 106, 107 (with this silhouette varying depending upon where a light source is actually or virtually positioned in the display 100).

As an example, the view-dependent content may be input to the multi-view mask to augment and annotate real world objects while allowing a viewer to directly view the real world objects. This can all be achieved without the need for a heads-up display or camera-based display. For example, a person may be standing behind the magic window or multi-view mask in the background space, and the view-dependent content may be provided so as to replace their face with another virtual face all while their head/face are viewable in 3D from multiple view points.

FIG. 2 illustrates a 3D display system 200 that may be used to provide 3D augmentation of a physical object. In this example, the physical object 220 is a 3D skeleton or physical skeleton of a dinosaur or other animal. The display system 200 includes a multi-view mask 210, and the 3D skeleton 220 is placed behind the mask 210 or in a background space while a viewer 204 views the front side or display surface of the mask 210 along one, two, or more POV 205. Initially, the multi-view mask 210 may be operated or controlled to contain only or mostly a transparent portion or area 212 such that the 3D skeleton 220 can be viewed in its true or existing form. The mask 210 may then or initially be operated to provide augmenting information 216 in the form of a label, text, or other information (e.g., a name of the animal associated with the skeleton 220). Then, the multi-view mask 210 may be operated to dynamically add augmenting images 214 onto the 3D skeleton or object 220. For example, internal organs (or components) may first be added, followed by muscle (or intermediate layers or components), and then skin (or external or covering layers) for the object 220. The labels/information 216 may be changed or modified with each added object augmentation image(s) 214. Further, the labels 216 and augmenting images 214 are provided via the concurrent display via mask 210 of two, three, or more view-dependent sets of content or images such that the 3D image is viewable from two, three, or more view points (e.g., a range of viewing angles associated with each POV such left, middle, and right view points or POV as shown in FIGS. 1A-1D).

FIG. 3 illustrates in schematic form a 3D display system or assembly 300 of an embodiment of the present invention. As shown, the system 300 includes a background space or physical set 302 and a foreground or viewing space 306 in which a viewer 308 may observe or view 309 from two or more view points or POV (e.g., differing viewing angles). A multi-view mask assembly 310 is interposed or positioned between the background and foreground spaces 302, 306 and is operable to provide two, three, or more masks 309 to the viewer 308 that are viewable only at a like number of POV or viewing angles relative to the mask assembly 310 (or its display or front surface(s)). The background space may include one or more background or backdrop display elements 303 such as painted or colored panels with a thematic illustration(s), and the background space 302 typically will also include one or more 3D or physical background objects 304 spaced at varying locations and depths between the backdrop element 303 and the mask assembly 310. In this way, the mask assembly 310 may be operated to provide a view dependent silhouette mask for the objects 304, provide virtual objects at appropriate depths and orientations for differing POV among and interacting with objects 304, and/or to provide augmentation information and/or images for backdrop elements 303 and/or 3D objects 304.

The mask assembly 310 is shown to include a non-inverting relay lens 312 along with a mask display device 314. The non-inverting relay lens 312 may take a number of forms to practice the system 300 but, generally, is formed of a group of lenses that act to present an image without inverting the image for the viewer 308 in the display 309 (e.g., a conventional relay lens, in contrast, inverts an image). More particularly, the non-inverting relay lens 312 may include lenticular sheets or fly-eyes arrays stacked together such that images 309 provided to the viewer 308 of the backdrop element 303 and background objects 304 are not inverted. Further, the mask display device 314 is positioned within the non-inverting relay lens 314 such that its content (such as augmenting information/images) is also not inverted.

However, the content from display device 314 is directed outward 309 in a manner that is dependent upon view point or POV. For example, three sets of content/images associated with 3 POV may be provided concurrently in display input 331 to the display device 314, and the output display 309 includes these three sets of content/images viewable at 3 different viewpoints by the viewer 308 in light or output 309. One exemplary configuration for the mask assembly 310 is provided below with reference to FIGS. 5-7 using four lenslet arrays or lenticular sheets (although these could readily be replaced with four fly-eyes arrays/sheets of fly-eye lenses) with the display device sandwiched between an outer pair of the lenticular sheets. The mask display device 314 may be, for example, a transparent absorptive display (such as an LCD (liquid crystal display)) or a transparent emissive display (such as an OLED (organic light-emitting diode) display). In some embodiments, the mask display device 314 includes a plurality of programmable pixels selectively operable to be transparent or to at least partially block light (e.g., gray scale to black), and the pixels associated with the displayed mask are programmed or operated by a display controller 320 to at least partially block light. The pixels, for example, may be liquid crystal pixels, e.g., the mask display device 314 can be provided with portions of a LCD panel that is modified to remove components but retain a polarizer, the LC pixels, and an analyzer portion.

The display system 300 further includes a display controller 320 operating to provide the display input 331 to the mask display device 314 to provide a magic window effect 309 for a viewer 308. The controller 320 may include one or more processors 322 running software or display control programs (not shown but may be in memory 326) to provide the display input 331. I/O devices 324 such as keyboards, a mouse, a monitor with or without a touch screen, and the like may be included to allow an operator to cause the controller 320 to begin to provide display input 331 and/or to select which sets of content 330 to provide in display input 331. The controller 320 includes memory 326 that stores mask content 330 which defines sets of pixels or display portions/areas of the display device 314 that will be blocked 332, filtered 334, light passing or transparent 336, and/or will add light 338.

Significantly, the mask content 330 includes two, three, four, or more sets of view-dependent or POV content for displayed images (or points in time for providing light/image 309 to viewer 308). In this manner, the display input 331 causes the display device 314 to concurrently display two, three, or more view-dependent masks or three POV masks in output 309 to viewer 308. For example, the mask assembly 310 may support 3 POV for viewer 308 and, in such a case, the display input 331 may include 3 POV images or sets of content that are interlaced or interdigitized for viewing 309 such as when the lenses of relay 312 include lenticules or lenslets.

Figure 4:
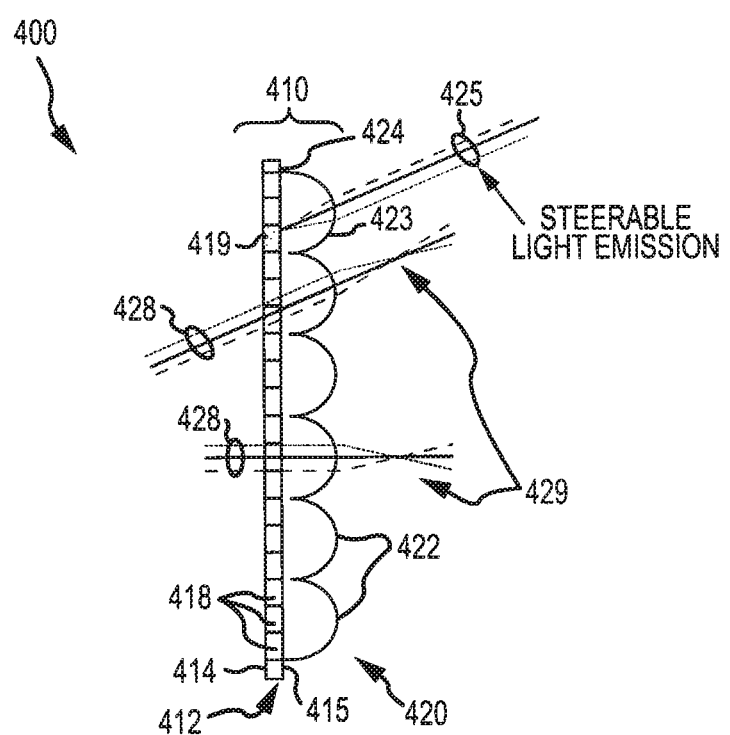
FIG. 4 illustrates a conventional lenticular-based display used to steer light from a display in various directions.

FIG. 4 illustrates a top view of a display system 400 with a conventional lenticular display assembly 410. As shown, a display device 412 such as an LCD is provided with a back surface 414 and a front or display surface 415. A lenticular sheet 420 is positioned with an inner or back planar surface 424 abutting the display surface 415 and with a plurality of lenticules or lenslets 422 (e.g., typically, elongated lenses with a semi-circular cross section as shown) facing away from the display device 412. As shown, three columns of pixels 418 are associated or paired with each lenticule 422 such that an interlaced or interdigitized image containing three differing images can be viewed through each of the lenticules 422 by changing a view point or angle of viewing. In other words, a viewer can move their head left to right to view three differing images provided in the columns of pixels 418 of display 412. This can be seen with pixel (or column of pixels) 419 is used to provide light emission that is steerable with lenslet 423 as shown with light 425 directed at a particular viewing angle or POV (e.g., to a right POV). Typically, the back surface/layers 414 would be opaque such that only light 425 emitted by the LCD or other display is viewed 425 through the lenticular sheet 420.

FIG. 4 illustrates a top view of a display system 400 with a conventional lenticular display assembly 410. As shown, a display device 412 such as an LCD is provided with a back surface 414 and a front or display surface 415. A lenticular sheet 420 is positioned with an inner or back planar surface 424 abutting the display surface 415 and with a plurality of lenticules or lenslets 422 (e.g., typically, elongated lenses with a semi-circular cross section as shown) facing away from the display device 412. As shown, three columns of pixels 418 are associated or paired with each lenticule 422 such that an interlaced or interdigitized image containing three differing images can be viewed through each of the lenticules 422 by changing a view point or angle of viewing. In other words, a viewer can move their head left to right to view three differing images provided in the columns of pixels 418 of display 412. This can be seen with pixel (or column of pixels) 419 which is used to provide light emission that is steerable with lenslet 423 as shown with light 425 directed at a particular viewing angle or POV (e.g., to a right POV). Typically, the back surface/layers 414 would be opaque such that only light 425 emitted by the LCD or other display is viewed 425 through the lenticular sheet 420.

However, if the display device 412 and its surface 414 were transparent, background light 428 may be selectively passed through the display device 412 by making a pixel 418 transparent. The light 428 from the background is passed through the lenticules or lenslets 422 as shown at 429, and this may include light reflected from 3D objects in the background or opposite the lenticular sheet 420. As will be understood, the lenticular display system 400 may be used to controllably steer light including light 429 in a particular direction from a desired point. However, the display assembly 410 will not appear transparent to a viewer because the background light 429 will be diffused by the focusing power of the lenslets 422. In other words, a transparent LCD panel or other display element 412 behind one lenslet array 420 produces a multi-view 3D display. The lenslet array of lenslets 420 samples the light at different positions of the sheet 420. Each lenslet 422 maps the angle of light to a position on the LCD or other display element 412, and this display 400 can produce view-dependent or 3D images in space. Unfortunately, though, the background light 428 will be blurred out as the light 429 passes through the lenticules 422 because the lenticule sheet 420 acts as a diffuser in one direction.

To address this problem with use of lenticular sheets, the inventors determined that a relay lens could be provided by placing two lenticular sheets in a back-to-back arrangement with a transparent display assembly between them to provide a multi-view mask. In such an arrangement, a viewer can see background images through the relay lens along with any emissive display from the display device. However, the background images are flipped behind each lenslet or lenticule, and, to address this inversion or flipping issue, the inventors created a non-inverting relay lens assembly that included a second set or pair of lenticule sheets to flip the background images back to their correct orientation (as arranged in the background space or as viewed without any lens). Hence, the non-inverting relay lens assembly created may be thought of as a pair of relay lenses (each made up of a pair of lenticular sheets), and one includes the mask display device sandwiched between its two lenticular sheets.

Figure 5:
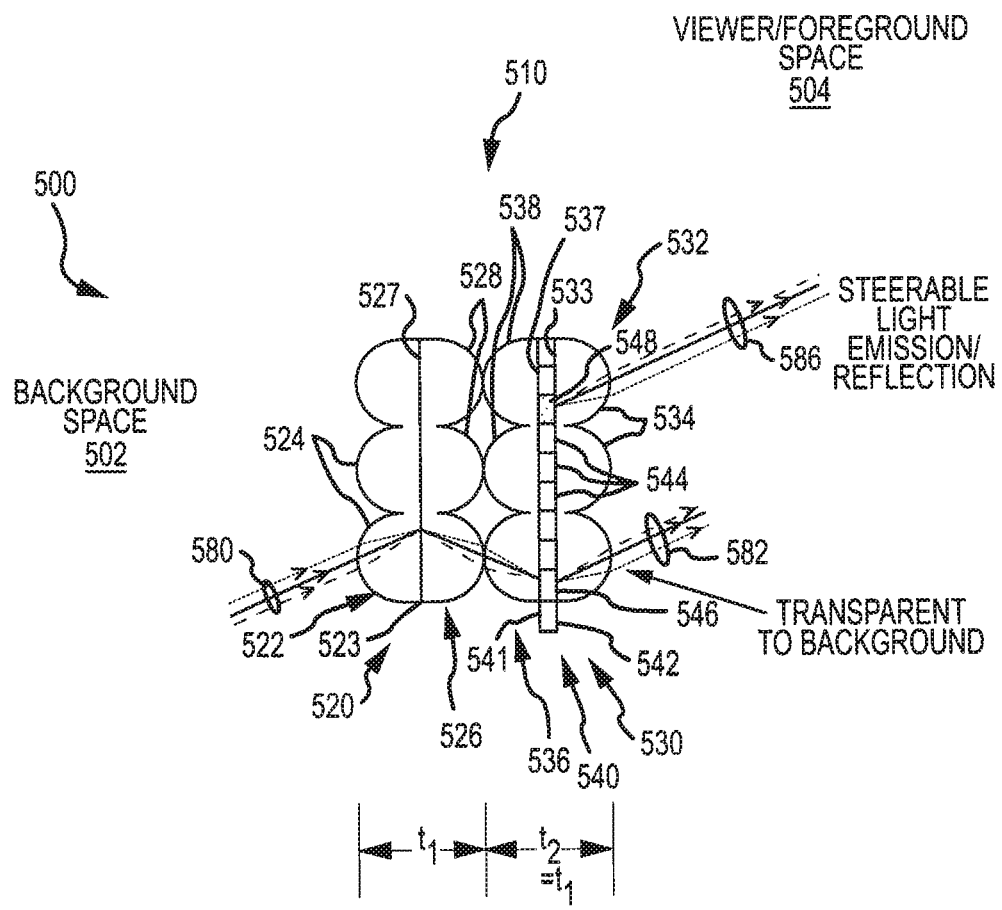
FIGS. 5-7 illustrate a 3D display assembly illustrating in detail one embodiment of a multi-view mask assembly or magic window of an embodiment of the description with two pairs of lenticular sheets or arrays of lenslets or lenticules are arranged to provide a non-inverting relay lens or lens assembly used in combination with a selectively transparent display device, with each figure showing operation of the display device to provide differing masking effects or functionality.

A top view of a 3D display system 500 is shown in FIG. 5 that implements the four lenticular sheet configuration to provide a non-inverting relay lens assembly. The 3D display system 500 includes background space 502 in which a physical set with real or virtual 3D objects may be provided and a viewer or foreground space 504 where a viewer would observe from two, three, or more viewing angles or POV. The display system 500 includes a multi-view mask (or mask assembly) 510 formed of a first relay lens 520 and a second relay lens 530. The first relay lens 520 is formed of a first lenticular sheet or array of lenslets 522 and a second lenticular sheet 526.

The sheets 522, 526 each include a plurality of elongated lenses or lenslets (or lenticules) 524, 528, respectively, with only three being shown for simplicity sake but a typical sheet 522, 526 including hundreds or thousands of lenticules 524, 528 (e.g., 20 to 100 lenticules per inch or a higher frequency may be used in some cases), and the lenticules typically are regular with the same width and depth and are arranged to be perfectly parallel to each other within each sheet 522, 526. The lens direction typically is vertical as shown but may also be horizontal in some applications. The inner relay lens 520 is formed by placing the back side or planar sides 523, 527 of the two lenticular sheets 522, 526 in contact or to abut such that the lenticules 524, 528 face opposite directions (e.g., one into the background space 502 and one toward the viewer or foreground space 504). Further, each of the lenticules 524 of sheet 522 is aligned with one of the lenticules 528 of the sheet 526 in the relay lens 520. The back-to-back arrangement is used such that their focal planes are coincident. A 1:1 (one-to-one) relay is formed by taking identical lenses and spacing them so that their focal planes are coincident. The focal planes of most lenticulars are at their back (planar) surface since that is where printed interdigitated images are typically placed. Hence, the focal plane of lens 522 is at the back surface 523, and the focal plane of lens 526 is at the back surface 527. With the arrangement shown, the focal plane of lens 522 is coincident with the focal plane of lens 526.

The multi-view mask 510 further includes the second or outer relay lens 530 that is fixated similar to the lens 520 in that it includes a first lenticular sheet 532 and a second lenticular sheet 536. These two lenticular sheets 532, 536 are arranged such that the back or planar sides 533, 537 are facing each other and lenticules 534 of sheet 532 and lenticules 538 of sheet 536 face outwards or away from each other (one set facing the viewer/foreground space 504 and one set facing the background space 502). As discussed above, the focal plane of lenticules 538 is coincident with the lenticules 534. The lenticular sheets 532, 536 do not abut or contact each other because the multi-view mask 510 includes a transparent mask display device 540 that is interposed or sandwiched between the lenticular sheets 532, 536 with a back or inner side 541 abutting or contacting the back side 537 of lenticular sheet 536 and a front or display side 542 abutting or contacting the back side 533 of lenticular sheet 532. As with relay lens 520, the lenticules 534, 538 of the each sheet 532, 536 are aligned with each other. When assembled, the lenticules 538 of sheet 536 are typically in contact with the lenticules 528 of sheet 526 with no air gap or spacing provided between the two relay lenses 520, 530. Again, the sheets 532 and 534 are arranged such that the focal plane of sheet 532 is coincident with the focal plane of sheet 536.

A number of pixels (or columns of pixels) 544 of the display 540 are paired with and placed under each of the pair of the lenticules 534, 538 of the sheets 532, 536. For example, the display system 500 may be operated to provide a 3D display viewable from 5 POV for a viewer. In such a case, 5 pixels or columns of pixels may be provided under each lenticule 534. In the display system 500, three pixels or pixel columns 544 are aligned with or provided under each lenticule 544 to as to facilitate displaying a dynamic mask with display 540 that is viewable from 3 POV along with images from the background space 502 via the non-inverting relay lens provided by the two pairs of lenticular sheets or first and second relay lenses 520, 530.

In addition to aligning the lenticules, the multi-view mask assembly 510 preferably is adapted such that the thickness of each of the relay lenses 520, 530 is substantially equal (e.g., equal to or within 10 percent of the thickness of the other). If four identical lenticular sheets were used for sheets 522, 526, 532, 536, the first relay lens 520 would have a first thickness, $t_1$, that would be less than the thickness, $t_2$, of second relay lens 530 due to the inclusion of the transparent display element 540 in the second relay lens 530. This would result in a blurring or distortion when a viewer concurrently viewed images from the background space 502 through the first relay lens 520 and images from the emissive display 540 via lenticular sheet 532. To resolve this issue, the second lenticular layer 536 may be thinned to account for the entire thickness of the display 540. This is where the LCD's image appears when viewed from the front. The focal plane of the front lenticular should be at the LCD image, i.e., should be at the LCD's front surface. Hence, the second lenticular can be thinned.

In some cases, both layers may be thinned (e.g., equally reduced in thickness by removing material from the planar sides 533, 537) such that the thicknesses, $t_1$ and $t_2$, of the relay lenses 520, 530 is substantially equal. The thicknesses of the lenticular sheets may vary widely to practice the invention such as from about 0.2 mm (and 200 LPI) to 4 mm (and 10 to 20 LPI) or the like, and the sheets 522, 526, 532, 536 may be formed of glass, a ceramic, or any of a wide variety of plastics or other materials for providing a transparent or at least translucent lenticular sheet.

Because the mask display is interdisposed, its thickness (and its index of refraction) should also be taken into account so that the focal planes of the two lenses are coincident. This can be done in a number of ways. As a first example, an undercut lenticular may be used so that the focal plane of the back lenticular is not at its back surface but is, rather, further behind. Thus, when the glass of the LCD panel is placed in contact, the focal plane of the undercut lenticular plus the LCD panel is at the front surface of the LCD panel (touching the front lenticular). As a second example, the back lenticular could be flipped so that its lenslet surface is facing the LCD and its planar surface is away from the LCD. The focal plane for light coming from the background into this backwards lenticular is not at the lenslet surface but, rather, is beyond it. With appropriate spacing, its focal plane will be on the other side of the LCD and coincident with the front lenticular's focal plane.

In some cases, there may also be a spacer or light diffuser between the front lenticular and the front LCD surface. To produce color, most LCDs have spatially multiplexed RGB filters/subpixels. When the LCD is at the focal plane of the lenticular, the color subpixels become apparent in the views. Spacing the lenticular and the LCD or placing a light diffuser between them blurs the RGB subpixels out. In some preferred embodiments, monochrome LCDs may be used (or temporally multiplexed LCDs or other types of absorptive displays), but these are presently more rare.

As shown in FIG. 5 with display system 500, a multi-view mask assembly 510 can be provided with a stack of four lenslet arrays 522, 526, 532, 536. This stack acts as a non-inverting relay and appears transparent to the background space 502 from viewer/background space 504. For example, light 580 from the background space 502 (such as reflected off of a 3D background object or the like) passes through lenticules 524, 528, 538, 534 as well as a column 546 of pixels in display element 540 as shown with arrows 582 for viewing in the foreground space 504. An OLED or other types of transparent emissive displays (such as emissive electrowetting displays or the like) may be provided for display element 540 between the two lenticular sheets 532, 536 to allow light to be emitted in a controllable direction from a desired position. For example, column 548 of pixels of display element 540 may be operated to output steerable light emission (or to provide a reflection of light from foreground space 504) 586 via a lenticule 534 of outer sheet 532. The display 540 may be operated to concurrently be emissive/reflective at pixel set/column 548 to provide light 586 and be transparent to background a pixel set/column 546 to provide background images/light 582. As shown, the rays 582, 586 are steered in a common direction for viewing concurrently at a particular POV such as the right POV by a viewer in the viewer space 504.

Figure 6:
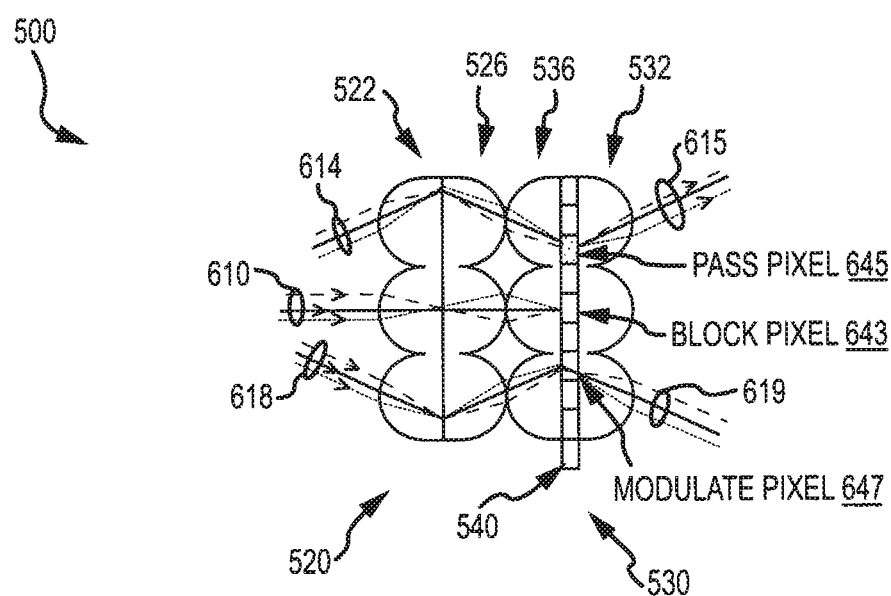

In FIG. 6, the 3D display system 500 is operated differently to concurrently block, pass, and modulate background light by operation of display controller (not shown but may be controller 320 of FIG. 3) to selectively program pixels. For example, the mask display device 540 may be a transparent LCD. A first column or set of pixels 643 may be programmed to block background light 610 such that it does not reach the foreground or viewer space, e.g., the background light 610 is blocked from view. A second column or set of pixels 645 of display element 540 may be concurrently (or separately) operated by a controller to pass light 614 as it passes through a stack of four lenticules in sheets 522, 526, 536, 532 such that the light 615 is directed for view from a particular POV. A third column or set of pixels 647 of display element 540 may be concurrently (or separately) operated by a controller to modulate or filter background light 618 passing through first and second relays lenses 520, 530, with the lenticules steering the light 601 in a particular direction for view from another POV such as the left POV.

Figure 7:
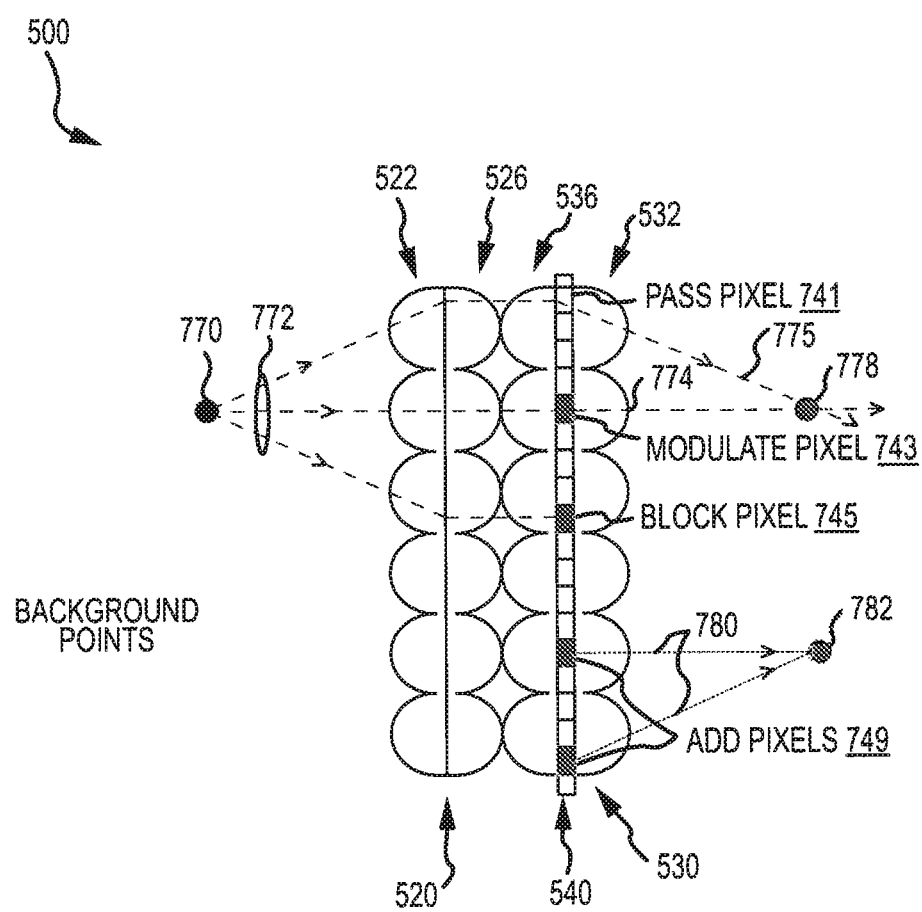

FIGS. 5 and 6 illustrate how various views may be created with the magic window or multi-view mask element 510. FIG. 7 illustrates that the mask element 510 may also be operated to add new points of an image or display. Points can be passed, modulated, or blocked for different positions and view points. Further, new points can be added to the display viewable by a viewer from two or more POV. As shown, a point 770 in the background space may reflect or be emissive to light 772 that travels through the first three layers 522, 526, 536 of the non-inverting relay lens stack until it strikes the display element 540. In this example, a pass pixel 741 is provided to pass light 776 to allow a viewer to view the point 778 from a particular POV, while concurrently a modulate pixel 743 acts to output modulated light 774 viewable as point 778 and a block pixel 745 acts to block the light 772 from the background point 770. The quadlenticular relays the point 770 to point 778, but the mask element 510 may be used to pass, filter, or remove views of the point. Additionally, a point 782 is made viewable via lenticular sheet 532 in particular POV by adding pixels 749 selectively operated by a controller to emit light 780 corresponding to the new or added point, but one could also have added a view to an already existing point. Hence, the quadlenticular relays the point 770 to 778, but the point's views can be passed, modulated, or removed. Similarly, views of that point (or a new point) can be added using an emissive add pixel.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As discussed, a magic window or multi-view mask display device may be provided with four lenslet arrays (e.g., lenticular sheets, fly-eyes arrays, or the like) stacked together with a transparent LCD panel or transparent OLED panel placed between two of the layers or arrays in the stack. Each lenslet array is composed of many small lenslets. When two lenslet arrays or lens sheets are stacked together, the combination acts as a set of relay lenses (or a first relay lens assembly) that transfers the image of the space behind the sheets to a viewing area or space in front of the sheets. However, each set of stacked lenslets also flips its individual images and the overall sheet may flip the entire image. This would make the background appear distorted when viewed through the stack of lens sheets. To remove the flipping and distortion, another set of two lens sheets is added to the stack to flip each lenslet image (and the overall image) again. This corrects the individual and overall image orientations, and the stack of four lenslet arrays or lens sheets appears transparent to a viewer. To create a transparent multi-view mask device or assembly, an LCD panel and/or transparent OLED panel can be placed between two of the lenslet layers. In some implementations, the LCD panel acting as a mask display device can block, pass, or modulate the light depending upon the light's angle and position. In other cases, the OLED panel acting as a mask display device can add light at a desired position and in a steered direction.

The transparent multi-view mask may be used in numerous settings and has many applications. In this regard, the above 3D display systems used the terms "background space" and "foreground or viewer space," and these generally refer to a space with 3D objects behind the multi-view mask (or on a side opposite the viewer) and to a space containing the viewer or user of the mask. In one embodiment or application envisioned by the inventors, the multi-view mask is provided as a portion of a vehicle windscreen or windshield and operated by a controller as a heads-up display (HUD). Prior HUDs were difficult to provide in windshields. A user would have to focus close up on the windshield to see and read the display or HUD while they were also trying to drive and refocus to a distance and the road to see what is outside their vehicle.

In contrast, a multi-view mask-based HUD may be provided for a vehicle such as in the form of a quadlenticular assembly with a transparent display provided in one pair of the relay lenses. This multi-view mask may be provided as part of a vehicle windshield and operated selectively to provide beads-up display information similar to the providing of augmentation information and/or images described above (without being limited to providing an overlay of 3D objects in the background space or providing information related to such 3D objects). In this way, the background space is the space outside the vehicle (e.g., the road and objects along the road), while the foreground or viewer space is the interior of the vehicle. During operation of the HUD, the displayed or HUD information may be presented to appear far away or at a distance similar to the road and its 3D objects to facilitate focusing both on the road and its background objects and on the HUD information. Further, much of the multi-view mask-based HUD may be transparent to the background space (or the road) and the road view is "relayed" or passed through the multi-view mask's non-inverting lens without distortion. Hence, a viewer alternating between looking at the HUD and the road through other portions of the windshield will not be forced to refocus.

We claim:

1. A multi-view mask apparatus for creating a three-dimensional (3D) display, comprising:
   a relay lens assembly that is transparent and is non-inverting of images passed through the relay lens assembly; and
   a mask display device operable to concurrently display a first mask content and a second mask content via the relay lens assembly,
   wherein the first mask content is viewable from a first point of view (POV) and wherein the second mask content is viewable from a second POV differing from the first POV and
   wherein the relay lens assembly comprises a stack of four lenticular sheets formed of a transparent material with lenticules of the lenticular sheets being aligned and with the lenticular sheets arranged in first and second pairs with each of the pairs having coincident focal planes.

2. The apparatus of claim 1, wherein the first mask content is apparent from a first light source position and wherein the second mask content is apparent from a second light source position differing from the first light source position.

3. The apparatus of claim 1, wherein the mask display device is disposed within one of the first and second pairs of the lenticular sheets between and in contact with the back, planar sides and the other one of the first and second pairs of the lenticular sheets is arranged with the back, planar sides in abutting contact.

4. The apparatus of claim 3, wherein a thickness of the first or second pair of the lenticular sheets including the mask display device equals a thickness of the first or second pair without the mask display device.

5. The apparatus of claim 3, wherein the mask display device comprises a transparent absorptive display or a transparent emissive display with first and second sets of pixels associated with each of the lenticules and the first and second sets of pixels operated to display the first and second mask content.

6. The apparatus of claim 1, wherein the mask display device comprises a plurality of programmable pixels selectively operable to provide the first and second mask content including a number of the pixels operating to block light and a number of the pixels passing light.

7. The apparatus of claim 6, wherein the programmable pixels are further operable with a number of the pixels modulating light and a number of the pixels adding light.

8. The apparatus of claim 1, further comprising a background space viewable through the relay lens assembly and the mask display device and a controller selectively inputting a display input to the mask display device including the first and second mask content, wherein the background space includes at least one physical 3D object and the display input includes interdigitized masks with proper occlusion for the physical 3D object at the first and the second POV.

9. A 3D display system, comprising:
   a background space including a physical 3D object;
   a mask display panel with a back side facing the background space and a display side facing away from the background space;
   a controller operating the mask display panel to concurrently display a first mask dependent upon a first POV or light source direction of the background space and the physical 3D object and a second mask dependent upon a second POV or light source direction of the background space and the physical 3D object, wherein the first and second masks include transparent portions; and
   a non-inverting relay lens mated with the mask display panel steering light associated with the first mask and the physical 3D object at a first angle based on the first POV and steering light associated with the second mask and the physical 3D object at an a second angle based on the second POV,
   wherein the non-inverting relay lens comprises a stack of four lenslet arrays arranged to provide a pair of relay lenses and
   wherein the mask display panel is sandwiched between two of the lenslet arrays in one of the pairs of the relay lenses.

10. The system of claim 9, wherein the mask display panel comprises a number of programmable pixels and the first mask and the second mask define a set of the pixels to be used to provide the transparent portions and a set of the pixels to be used to block light from the background space to occlusion based on the physical 3D object for the first and second POV.

11. The system of claim 10, wherein the first and second masks further define a set of pixels for use in modulating light from the background space for each of the first and second POV.

12. The system of claim 9, wherein content associated with the first mask is apparent from the first light source direction and content associated with the second mask content is apparent from the second light source direction.

13. The system of claim 9, wherein the first mask and the second mask include augmenting images viewable as overlays on the physical 3D object and oriented for viewing from the first and second POV, respectively, with the physical 3D object.

14. The system of claim 13, wherein the mask display panel comprises a transparent absorptive display or a transparent emissive display and wherein the first and second masks comprise interdigitized images each viewable from one of the first and second POV.

15. A display system for displaying a 3D display including a background object positioned in a background space to a viewer in a foreground space, comprising:
  a stack of four lenslet arrays arranged as a first relay lens and a second relay lens, wherein, when the background space is viewed from the foreground space via the stack, the stack is transparent and is non-inverting of an image of the background object;
  a display panel positioned in the first relay lens between a pair of the lenslet arrays, the display panel being operable to selectively pass or block light with a plurality of programmable pixels; and
  a controller in communication with the display panel and operating to provide display input causing the display panel to concurrently display first POV-dependent content, second POV-dependent content, and third POV-dependent content by selectively passing and blocking light, wherein the stack steers the first POV-dependent content toward a left viewing space in the foreground space, the second POV-dependent content toward a middle viewing space, and the third POV-dependent content toward a right viewing space.

16. The display system of claim 15, wherein the first, second, and third POV-dependent content includes a virtual image oriented and with proper occlusion with respect to the background object for viewing the background space from the left, middle, and right viewing spaces, respectively.

17. The display system of claim 15, wherein the first, second, and third POV-dependent content includes augmentation images displayed over a portion of the background object and oriented to match viewing of the background object with the augmentation images from the left, middle, and right viewing spaces, respectively.

18. The display system of claim 15, wherein each of the lenslet arrays comprises a lenticular sheet and wherein the first and second relay lens are formed by positioning back, planar sides of the relay lens proximate to each other in two pairs of the lenticular sheets.

19. The display system of claim 15, wherein the display panel comprises a transparent emissive display device.

20. The display system of claim 19, wherein the transparent emissive display device comprises a transparent absorptive display or a transparent emissive display and wherein the first, second, and third POV-dependent content comprises sets of pixels programmed to block, filter, pass, or add light.

* * * * *